United States Patent
Rimlinger

(10) Patent No.: US 7,788,659 B1
(45) Date of Patent: Aug. 31, 2010

(54) METHOD OF CONVERTING COMPUTER PROGRAM WITH LOOPS TO ONE WITHOUT LOOPS

(75) Inventor: Francis S. Rimlinger, Ellicott City, MD (US)

(73) Assignee: United States of America as represented by the Director, the National Security Agency, Washington, DC (US)

( * ) Notice: Subject to any disclaimer, the term of this patent is extended or adjusted under 35 U.S.C. 154(b) by 856 days.

(21) Appl. No.: 11/713,829

(22) Filed: Feb. 27, 2007

(51) Int. Cl.
*G06F 9/45* (2006.01)
(52) U.S. Cl. .................. 717/160; 717/156; 717/157
(58) Field of Classification Search .................. 717/160
See application file for complete search history.

(56) References Cited

U.S. PATENT DOCUMENTS

| | | | |
|---|---|---|---|
| 5,797,013 A * | 8/1998 | Mahadevan et al. ......... 717/160 |
| 6,058,266 A | 5/2000 | Megiddo et al. |
| 6,253,373 B1 | 6/2001 | Peri |
| 6,272,676 B1 | 8/2001 | Haghighat et al. |
| 6,594,783 B1 * | 7/2003 | Dollin et al. .................. 714/38 |
| 7,631,305 B2 * | 12/2009 | Rong et al. .................. 717/161 |
| 2007/0079281 A1 * | 4/2007 | Liao et al. .................. 717/106 |

* cited by examiner

*Primary Examiner*—Wei Y Zhen
*Assistant Examiner*—Phillip H Nguyen
(74) *Attorney, Agent, or Firm*—Robert D. Morelli

(57) ABSTRACT

The present invention is a method of eliminating loops from a computer program by receiving the program, graphing its function and control, identifying its entry point, and identifying groups of loops connected to its entry point. Stop if there are no such groups. Otherwise, selecting a group of loops. Then, identifying the selected group's entry point. If the selected group includes no group of loops having a different entry point then replacing it with a recursive or non-recursive function, reconfiguring each connection entering and exiting the selected group to preserve their functionality, and returning to the fifth step. Otherwise, identifying groups of loops in the selected group connected to, but having different entry points and returning to the loop selection step.

12 Claims, 2 Drawing Sheets

METHOD OF CONVERTING COMPUTER PROGRAM WITH LOOPS TO ONE WITHOUT LOOPS

FIELD OF THE INVENTION

The present invention pertains to data processing and, more particularly, to analyzing the execution of a computer program.

BACKGROUND OF THE INVENTION

With more and more commercial activity being conducted via computers, computer security is becoming more of a concern to the average computer user. One aspect of computer security is verifying that a computer program operates as advertised.

Computer programmers use various computer languages (e.g., C++, Perl, JAVA etc.) to write computer programs. A computer program written in a human readable programming language is called source code. Source code must be converted, or compiled, into a form that can be read by a computer before the computer program can be run on a computer. A computer readable program is called object code.

Each line of object code provides some type of information to a computer (e.g., an instruction, data, etc.). Collectively, the lines of object code control the operation of a computer. The execution sequence of object code is called control flow.

Because of the possibility of looping and branching within loops, a brute force attempt to enumerate the paths through a computer program will most likely fail. Therefore, there is a need for a method of converting a computer program that contains loops to one that does not.

U.S. Pat. No. 6,058,266, entitled "METHOD OF, SYSTEM FOR, AND COMPUTER PROGRAM PRODUCT FOR PERFORMING WEIGHTED LOOP FUSION BY AN OPTIMIZING COMPILER" discloses a method, device, and computer program product of combining loops of the same type (i.e., parallel or serial) if contractable. U.S. Pat. No. 6,058,266 does not eliminate loops in a computer program as does the present invention. U.S. Pat. No. 6,058,266 is hereby incorporated by reference into the specification of the present invention.

U.S. Pat. No. 6,253,373, entitled "TRACKING LOOP ENTRY AND EXIT POINTS IN A COMPILER," discloses a device for and method of separating the tracking of loop entry and exit points and loop optimization information (e.g., if two loops were formed from one loop). U.S. Pat. No. 6,253,373 does not eliminate loops in a computer program as does the present invention. U.S. Pat. No. 6,253,373 is hereby incorporated by reference into the specification of the present invention.

U.S. Pat. No. 6,272,676, entitled "METHOD AND APPARATUS FOR FINDING LOOP-LEVEL PARALLELISM IN A POINTER BASED APPLICATION," discloses a device for and method of finding loop-level parallelism and flagging the same for possible multi-thread execution. U.S. Pat. No. 6,272,676 does not eliminate loops in a computer program as does the present invention. U.S. Pat. No. 6,272,676 is hereby incorporated by reference into the specification of the present invention.

SUMMARY OF THE INVENTION

It is an object of the present invention to convert a computer program with loops to one without loops.

It is another object of the present invention to convert a computer program with loops to one without loops by repeatedly replacing loops that share a common entry point with a recursive or nor recursive function until all of the loops are eliminated.

It is another object of the present invention to convert a computer program with loops to one without loops by repeatedly replacing loops that share a common entry point with a recursive or nor recursive function until all of the loops are eliminated so that the order of execution of the computer program is preserved.

The present invention is a method of converting a computer program with loops to one without loops.

The first step of the method is receiving the computer program.

The second step of the method is creating a graph of the computer program's function and control.

The third step of the method is identifying the computer program's entry point.

The fourth step of the method is identifying disjoint groups of mutually connected loops that are connected to the computer program's entry point.

The fifth step of the method is stopping if there are no groups of mutually connected loops connected to the computer program's entry point. Otherwise, selecting a group of mutually connected loops connected to the computer program's entry point.

The sixth step of the method is identifying the selected group's entry point.

If the selected group includes no disjoint groups of mutually connected loops having entry points different from the selected group's entry point then the seventh step of the method is replacing the selected group with a recursive or non-recursive function that is equivalent to that of the selected group, reconfiguring each connection entering and exiting the selected group to preserve their functionality, and returning to the fifth step.

The eighth step of the method is identifying disjoint groups of mutually connected loops in the selected group connected to, but having entry points different from, the entry point of the selected group and returning to the fifth step.

DETAILED DESCRIPTION

The present invention is a method of converting a computer program with loops to one without loops.

Figure 1:
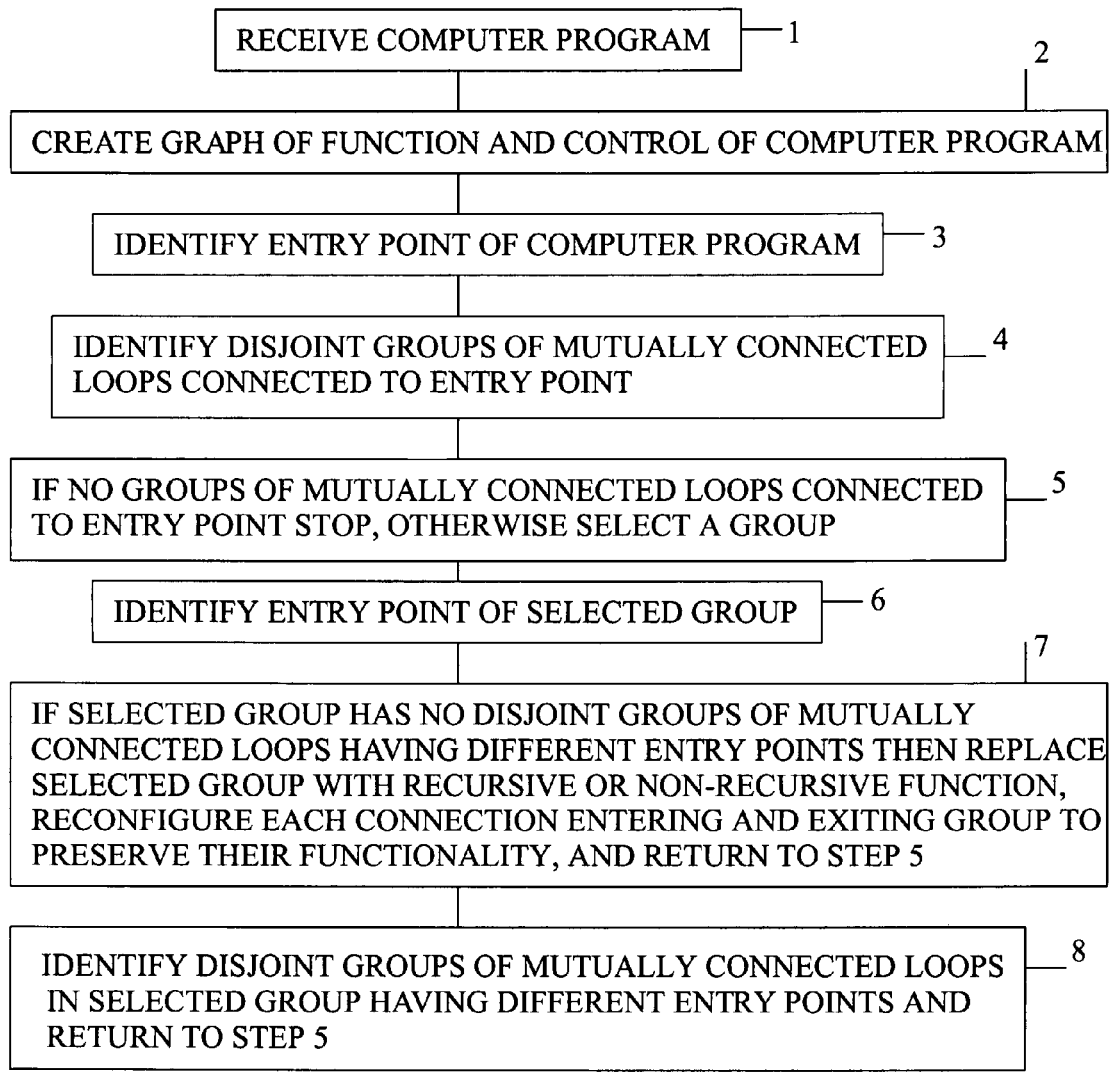
FIG. 1 is a list of the steps of the present invention.

The steps of the method are listed in FIG. 1.

The first step 1 of the method is receiving the computer program. In the preferred embodiment, the computer program received is source code in Java, a high-level programming language developed by Sun Microsystems. The state of a computer program written in Java is readily identified because Java targets a virtual computer or virtual machine. The Java virtual machine model contains an idealized stack to model program execution and an idealized heap to model data persistence. Instructions in a computer program alter the stack and heap. A description of each instruction as a state transition function is provided in a Java virtual machine. However, the present invention is applicable to any computer programming language.

The second step 2 of the method is creating a graph of the computer program's function and control. In the preferred embodiment, a graph of function and control is a graph of the machine-level instructions that shows the transition from one machine-level instruction to another.

The third step 3 of the method is identifying the computer program's entry point. An entry point of a computer program is the first instruction of the computer program.

The fourth step 4 of the method is identifying disjoint groups of mutually connected loops that are connected to the computer program's entry point. In other words, identifying each separate group of loops connected to the entry point of the computer program.

Figure 2:
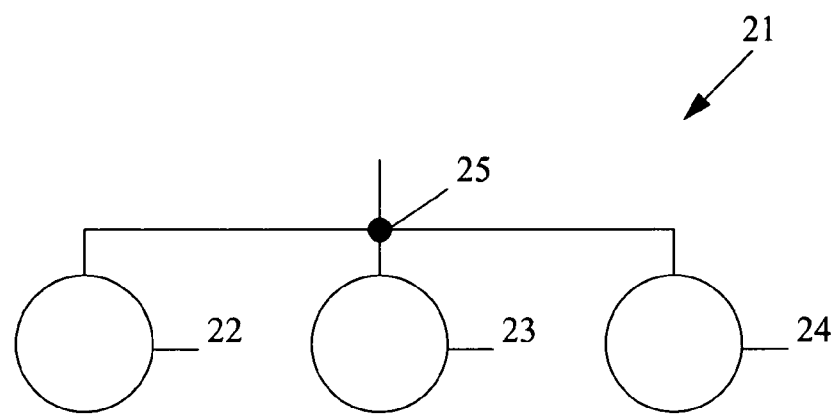
FIG. 2 is a diagram of a computer program that includes disjoint groups of mutually connected loops connected to the entry point of the computer program.

FIG. 2 is an exemplary diagram of a computer program 21 which includes a number of separate groups of loops 22, 23, 24, where each separate group of loops is connected to the entry point 25 of the computer program 21. A group of loops may be a loop containing a single loop or a loop containing multiple loops.

Figure 3:
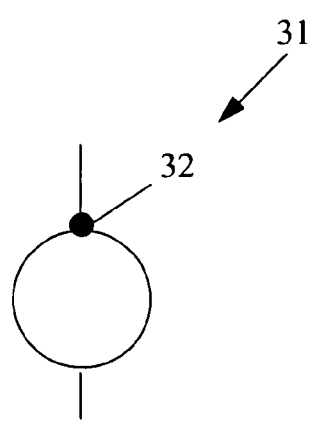
FIG. 3 is a diagram of a single loop, where the loop is connected to its entry point.

FIG. 3 is a diagram of a single loop 31. The single loop 31 has an entry point 32. An entry point into a loop is the first instruction of the loop.

Figure 4:
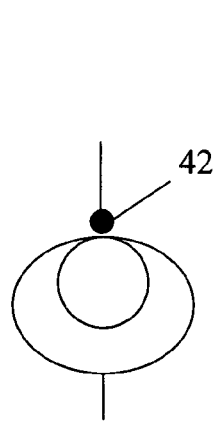
FIG. 4 is a diagram of a multiple loop, where each loop is connected to the entry point of the multiple loop.

FIG. 4 is a diagram of a multiple loop 41, where each loop is connected to the entry point 42 of the multiple loop 41. That is, the entry point 42 of the multiple loop 41 is also the entry point of each loop in the multiple loop 41.

Figure 5:
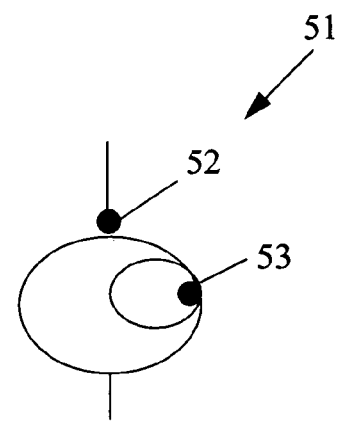
FIG. 5 is a diagram of a multiple loop, where all of the loops are not connected to the entry point of the multiple loop.

FIG. 5 is a diagram of a multiple loop 51, having an entry point 52. The difference between the multiple loop 51 of FIG. 5 and the multiple loop 41 of FIG. 4 is that the entry point 52 of the multiple loop 51 of FIG. 5 is not the entry point of all of the loops in the multiple loop 51.

FIGS. 3-5 are exemplary. Other loops that vary in number of loops and position of entry point are within the scope of the present invention. In the following steps, loops of the types shown in FIG. 3 and FIG. 4 are treated the same, whereas loops of the type shown in FIG. 5 are treated differently. Therefore, a group of mutually connected loops may be of the type of FIG. 3, FIG. 4, or FIG. 5.

The fifth step 5 of the method listed in FIG. 1 is stopping if there are no groups of mutually connected loops 22, 23, 24 connected to the computer program's entry point 25. Otherwise, selecting a group of mutually connected loops 22, 23, 24 connected to the computer program's entry point 25. That is, a separate group of loops is selected until there is no such loop left to select.

The sixth step 6 of the method is identifying the selected group's entry point. For example, in a loop of FIG. 3, the entry point 32 would be identified; in a loop of FIG. 4, the entry point 42 would be identified; and in a loop of FIG. 5, the entry point 52 would be identified.

If the selected group includes no disjoint groups of mutually connected loops having entry points different from the selected group's entry point then the seventh step of the method is replacing the selected group with a recursive or non-recursive function that is equivalent to that of the selected group, reconfiguring each connection entering and exiting the selected group to preserve their functionality, and returning to the fifth step. In other words, if a loop is of the type of FIG. 3 or FIG. 4 then replace it with an equivalent recursive or non-recursive function, reconfiguring each connection entering and exiting the selected group to preserve their functionality, and return to the fifth step 5. Replacing a loop with a recursive or non-recursive function eliminates the loop from the computer program. If a loop can be replaced with either a recursive or non-recursive function, replace the loop with the non-recursive function. Non-recursive functions are more easily processed than recursive ones.

The eighth step of the method is identifying disjoint groups of mutually connected loops in the selected group connected to, but having entry points different from, the entry point of the selected group and returning to the fifth step. In other words, if the loop is of the type of FIG. 5 then decompose the loop further by identifying separate loops contained therein (just as in step 1 for the entire computer program) so that the loop will eventually be reduced to a set of loops of the type of FIG. 3 and FIG. 4. As each loop of the type of FIG. 3 and FIG. 4 are identified in a loop of the type of FIG. 5, it is replaced with its equivalent function. Repeated application of this step will eventually lead to the elimination of the loop.

What is claimed is:

1. Method of converting a computer program with loops to one without loops, comprising the steps of:
   (a) receiving the computer program
   (b) creating a graph of the computer program's function and control;
   (c) identifying the computer program's entry point;
   (d) identifying at least one group of mutually connected loops that are connected to the computer program's entry point;
   (e) stopping if there are no groups of mutually connected loops connected to the computer program's entry point, otherwise selecting a group of mutually connected loops connected to the computer program's entry point;
   (f) identifying the selected group's entry point;
   (g) if there are no at least one group of mutually connected loops in the selected group connected to, but having entry points different from, the selected group's entry point then:
      a. replacing the selected group with a function selected from a group of functions consisting of non-recursive function equivalent to that of the selected group and recursive function equivalent to that of the selected group;
      b. reconfiguring each connection entering and exiting the selected group to preserve their functionality; and
      c. returning to step (e); and
   (h) identifying at least one group of mutually connected loops in the selected group connected to, but having entry points different from, entry point of the selected group, and returning to step (e).

2. The method of claim 1, wherein the step of receiving the computer program and its functional description is comprised of the step of receiving source code in a JAVA computer programming language.

3. The method of claim 1, wherein the step of creating a graph of the computer program's function and control is comprised of the step of creating a graph of the computer program's function and control that shows the transition from one machine-level instruction in the computer program to another.

4. The method of claim 1, wherein the step of identifying the computer program's entry point is comprised of the step of identifying the computer program's first instruction.

5. The method of claim 1, wherein the step of identifying at least one group of mutually connected loops that are connected to the computer program's entry point is comprised of the step of identifying at least one group of mutually connected loops that are connected to the computer program's entry point that include loops selected from the group of loops consisting of a single loop, a multiple loop having a common entry point, and a multiple loop not having a common entry point.

6. The method of claim 1, wherein the step of identifying the selected group's entry point is comprised of the step of identifying the selected group's first instruction.

7. The method of claim 1, wherein the step of replacing the selected group with a function selected from a group of functions consisting of non recursive function equivalent to that of the selected group and recursive function equivalent to that of the selected group is comprised of the steps of replacing the selected group with a function selected from a group of functions consisting of non recursive function equivalent to that of the selected group and recursive function equivalent to that of the selected group, where the non-recursive function is selected over the recursive function.

8. The method of claim 2, wherein the step of creating a graph of the computer program's function and control is comprised of the step of creating a graph of the computer program's function and control that shows the transition from one machine-level instruction in the computer program to another.

9. The method of claim 8, wherein the step of identifying the computer program's entry point is comprised of the step of identifying the computer program's first instruction.

10. The method of claim 9, wherein the step of identifying at least one group of mutually connected loops that are connected to the computer program's entry point is comprised of the step of identifying at least one group of mutually connected loops that are connected to the computer program's entry point that include loops selected from the group of loops consisting of a single loop, a multiple loop having a common entry point, and a multiple loop not having a common entry point.

11. The method of claim 10, wherein the step of identifying the selected group's entry point is comprised of the step of identifying the selected group's first instruction.

12. The method of claim 11, wherein the step of replacing the selected group with a function selected from a group of functions consisting of non-recursive function equivalent to that of the selected group and recursive function equivalent to that of the selected group is comprised of the steps of replacing the selected group with a function selected from a group of functions consisting of non-recursive function equivalent to that of the selected group and recursive function equivalent to that of the selected group, where the non-recursive function is selected over the recursive function.

\* \* \* \* \*